United States Patent
Nakamura et al.

[11] Patent Number: 6,115,150
[45] Date of Patent: Sep. 5, 2000

[54] IMAGE DATA PROCESSING APPARATUS AND IMAGE DATA PROCESSING PROCESS

[75] Inventors: Koji Nakamura; Masayuki Mizuno; Syuji Hayashi, all of Osaka, Japan

[73] Assignee: Mita Industrial Co., Ltd., Osaka, Japan

[21] Appl. No.: 08/802,608

[22] Filed: Feb. 19, 1997

[30] Foreign Application Priority Data

Feb. 20, 1996 [JP] Japan ................................ 8-032386

[51] Int. Cl.$^7$ .............................. G03F 3/08; H04N 1/46; G06K 9/00
[52] U.S. Cl. ...................... 358/521; 358/523; 358/524; 358/534; 382/167
[58] Field of Search .................................. 358/518, 521, 358/523, 524, 525, 530, 534; 382/162, 165, 167, 169, 170, 254, 274; 395/109

[56] References Cited

U.S. PATENT DOCUMENTS

| | | | |
|---|---|---|---|
| 5,539,539 | 3/1993 | Fujimoto et al. | 358/518 |
| 5,585,927 | 5/1993 | Fukui et al. | 358/521 |
| 5,754,683 | 11/1994 | Hayashi et al. | 358/521 |
| 5,796,865 | 6/1995 | Aoyama et al. | 382/169 |

*Primary Examiner*—Kimberly A. Williams
*Attorney, Agent, or Firm*—Rabin & Champagne, P.C.

[57] ABSTRACT

An image data processing apparatus is provided which is adapted to perform an image processing process suitable for each of a plurality of image modes on the basis of an output gradation reference curve and computation data. Output image data are generated by processing inputted image data on the basis of an output gradation curve which is prepared for each image mode on the basis of an output gradation reference curve and computation data. Therefore, output gradation curves for respective image modes need not preliminarily be stored in storage means. For example, if two output gradation reference curves and 16 computation data are preliminarily stored in the storage means, the inputted image data can be subjected to a process corresponding to any of 32 image modes by using an output gradation reference curve and a computation data in combination.

17 Claims, 10 Drawing Sheets

FIG. 5

|     | +0  | +1  | +2  | +3  | +4  | +5  | +6  | +7  | +8  | +9  | +10 | +11 | +12 | +13 | +14 | +15 |
|-----|-----|-----|-----|-----|-----|-----|-----|-----|-----|-----|-----|-----|-----|-----|-----|-----|
| 0   | 0   | 1   | 2   | 3   | 3   | 4   | 5   | 6   | 6   | 7   | 8   | 9   | 9   | 10  | 11  | 12  |
| 16  | 12  | 13  | 14  | 15  | 15  | 16  | 17  | 18  | 18  | 19  | 20  | 21  | 21  | 22  | 23  | 24  |
| 32  | 24  | 25  | 26  | 27  | 27  | 28  | 29  | 30  | 30  | 31  | 32  | 33  | 33  | 34  | 35  | 36  |
| 48  | 36  | 37  | 38  | 39  | 39  | 40  | 41  | 42  | 42  | 43  | 44  | 45  | 45  | 46  | 47  | 48  |
| 64  | 48  | 49  | 50  | 50  | 51  | 52  | 52  | 53  | 54  | 54  | 55  | 56  | 56  | 57  | 58  | 58  |
| 80  | 59  | 60  | 60  | 61  | 62  | 62  | 63  | 64  | 63  | 65  | 66  | 66  | 67  | 68  | 68  | 69  |
| 96  | 70  | 70  | 71  | 72  | 72  | 73  | 74  | 74  | 75  | 76  | 76  | 77  | 78  | 78  | 79  | 80  |
| 112 | 80  | 81  | 82  | 82  | 83  | 84  | 84  | 85  | 86  | 86  | 87  | 88  | 90  | 91  | 92  | 93  |
| 128 | 95  | 96  | 97  | 98  | 100 | 101 | 102 | 103 | 105 | 106 | 107 | 108 | 110 | 111 | 112 | 113 |
| 144 | 115 | 116 | 117 | 118 | 120 | 121 | 122 | 123 | 125 | 126 | 127 | 128 | 130 | 131 | 132 | 133 |
| 160 | 135 | 136 | 137 | 138 | 140 | 141 | 142 | 143 | 145 | 146 | 147 | 148 | 150 | 151 | 152 | 153 |
| 176 | 155 | 156 | 157 | 158 | 160 | 161 | 162 | 163 | 165 | 166 | 167 | 168 | 170 | 171 | 172 | 173 |
| 192 | 175 | 176 | 177 | 178 | 180 | 181 | 182 | 183 | 185 | 186 | 187 | 188 | 190 | 191 | 192 | 193 |
| 208 | 195 | 196 | 197 | 198 | 200 | 201 | 202 | 203 | 205 | 206 | 207 | 208 | 210 | 211 | 212 | 213 |
| 224 | 215 | 216 | 217 | 218 | 220 | 221 | 222 | 223 | 225 | 226 | 227 | 228 | 230 | 231 | 232 | 233 |
| 240 | 235 | 236 | 237 | 238 | 240 | 241 | 242 | 243 | 245 | 246 | 247 | 248 | 250 | 251 | 252 | 253 |

F I G. 7
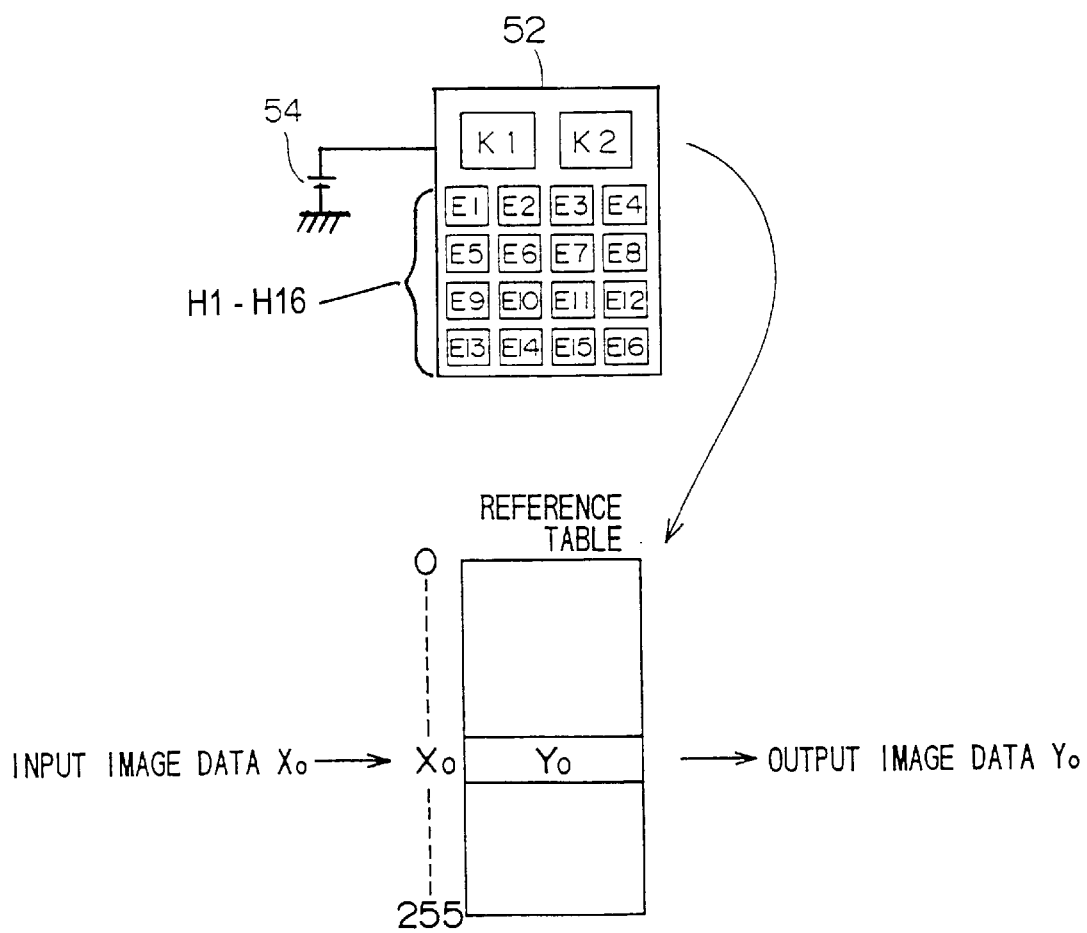

IMAGE DATA PROCESSING APPARATUS AND IMAGE DATA PROCESSING PROCESS

BACKGROUND OF THE INVENTION

1. Field of the Invention

The present invention relates to an image data processing apparatus and an image data processing process which are to be applied, for example, to a digital color copying machine capable of adjusting the quality of an image.

2. Description of Related Art

Digital color copying machines typically include a scanner section for reading an original image and outputting image data, an image processing section for processing the image data outputted from the scanner section, and an image formation section for forming an image on the basis of the image data processed by the image processing section. The scanner section, for example, includes a color CCD (charge coupled device) for outputting signals on the basis of the additive process of three primary colors including red (R), green (G) and blue (B), and a color conversion section for converting the signals outputted from the color CCD into image data on the basis of the subtractive process of three primary colors including cyan (C), magenta (M) and yellow (Y). The image processing section appropriately processes the signals outputted from the scanner section, and generates black (BK) image data. The image formation section includes a laser scanning section for outputting a laser beam on the basis of the color image data for the aforesaid four colors, and is adapted to form a color image with the use of four color toners, i.e., cyan, magenta, yellow and black color toners, on the basis of an electrophotographic process.

In the digital color copying machines, the density gradation levels of respective pixels constituting a document original image should be precisely reproduced to reproduce the image with a high fidelity. If image data outputted from the scanner section are directly applied to the laser scanning section, density gradation levels cannot precisely be reproduced due to the characteristics of the toners and the photoreceptor. Therefore, some digital color copying machines have a function for automatically adjusting the density gradation levels of an output image by correcting the image data in order to reproduce the original image with a high fidelity.

More specifically, an output gradation reference curve prepared in consideration of the toner characteristics, the photoreceptor characteristics and the like is stored in the form of a table in a memory. The output image data corresponding to the inputted image data are generated on the basis of the table.

Digital color copying machines are used not only for reproducing an original image with a high fidelity but also for processing an original image with some intention. For example, an image with clear characters can be formed by processing image data so that black characters in an image are enhanced. To facilitate such an image processing, some digital color copying machines offer, for example, four image quality modes including a character mode, a map mode, a photography mode, a character/photography mode, and are adapted to automatically change the quality of an image to be formed when one of these modes is selected.

Another exemplary image processing is to render a full-color original image into a monochrome image. Some digital color copying machines offer a full-color mode in which a full-color image is formed with the use of four color toners, and a monochrome mode in which a monochrome image is formed. The monochrome mode includes seven modes, i.e., modes adapted for forming a cyan, magenta, yellow or black monochrome image with the use of a single color toner, and modes adapted for forming a red, green or blue monochrome image with the use of two color toners. Such digital color copying machines are adapted to automatically change the color of an image to be formed when one of the eight color modes is selected.

In a digital color copying machine having the aforesaid image quality modes and color modes, its image processing section should process image data inputted from the scanner section in different manners depending on the selected mode so that an image having a different image quality and color is formed depending on the selected mode. In the full-color mode in which the four color toners are used, four images for the four colors, i.e., C, M, Y and BK, are sequentially formed, and transferred one on another on a transfer sheet. At this time, since toner particles cannot easily adhere onto the transfer sheet bearing one color toner image transferred thereon, the amount of each color toner adhering onto the transfer sheet is smaller than that in the monochrome mode using a single color toner. Therefore, where a single color toner is used, for example, image data to be outputted should have lower density gradation levels than the case where the four color toners are used.

Since the four image quality modes may be each combined with the eight color modes, 32 (=4×8) tables should be stored in the memory to cover all the modes for automatic gradation adjustment of an output image.

In addition, the mechanical characteristics vary from machine to machine and, hence, the tables for the output image gradation adjustment are prepared for each machine and installed therein.

Further, since the mechanical characteristics change with the lapse of time, the tables should be corrected by a technical service person.

However, the installation or correction of the 32 tables for each machine is a time-consuming task, which prevents the improvement in the productivity and the efficiency of the correction operation to be performed by the technical service person. Further, a large capacity memory is required for the storage of a large number of tables, preventing the cost reduction.

SUMMARY OF THE INVENTION

It is a first object of the present invention to provide an image data processing apparatus which requires a reduced amount of information for output gradation adjustment.

It is a second object of the present invention to provide an image forming apparatus which requires a reduced amount of information for output gradation adjustment.

It is a third object of the present invention to provide an image processing process which requires a reduced amount of information for output gradation adjustment.

In accordance with the present invention, output image data are generated by processing inputted image data on the basis of an output gradation curve which is prepared for each image mode on the basis of an output gradation reference curve and computation data.

Therefore, output gradation curves for respective image modes need not preliminarily be stored in storage means. For example, if two output gradation reference curves and 16 computation data are preliminarily stored in the storage means, the inputted image data can be subjected to a process corresponding to any of 32 image modes by using an output gradation reference curve and a computation data in combination. Therefore, the amount of the information stored in the storage means can be reduced. Accordingly, a smaller capacity memory can be used as the storage means, thereby reducing the production costs.

Since a smaller number of tables for the output gradation reference curves and the computation data are employed, an operation for installing the respective tables in a machine can be facilitated, leading to an improved productivity. Further, an operation for table correction which is required due to a time-related change of the mechanical characteristics of the machine should be performed only on the tables for the two output gradation reference curves. Therefore, the table correction operation can more readily be performed by a technical service person.

The foregoing and other objects, features and effects of the present invention will become apparent from the following detailed description of the preferred embodiments with reference to the attached drawings.

BRIEF DESCRIPTION OF THE DRAWINGS

FIG. 5 is a diagram illustrating one exemplary computation table;

FIG. 7 is a conceptual diagram for explaining operations to be performed by a CPU when output image data are produced in a character full-color mode and in a photography full-color mode;

DETAILED DESCRIPTION OF THE PREFERRED EMBODIMENTS

Figure 1:
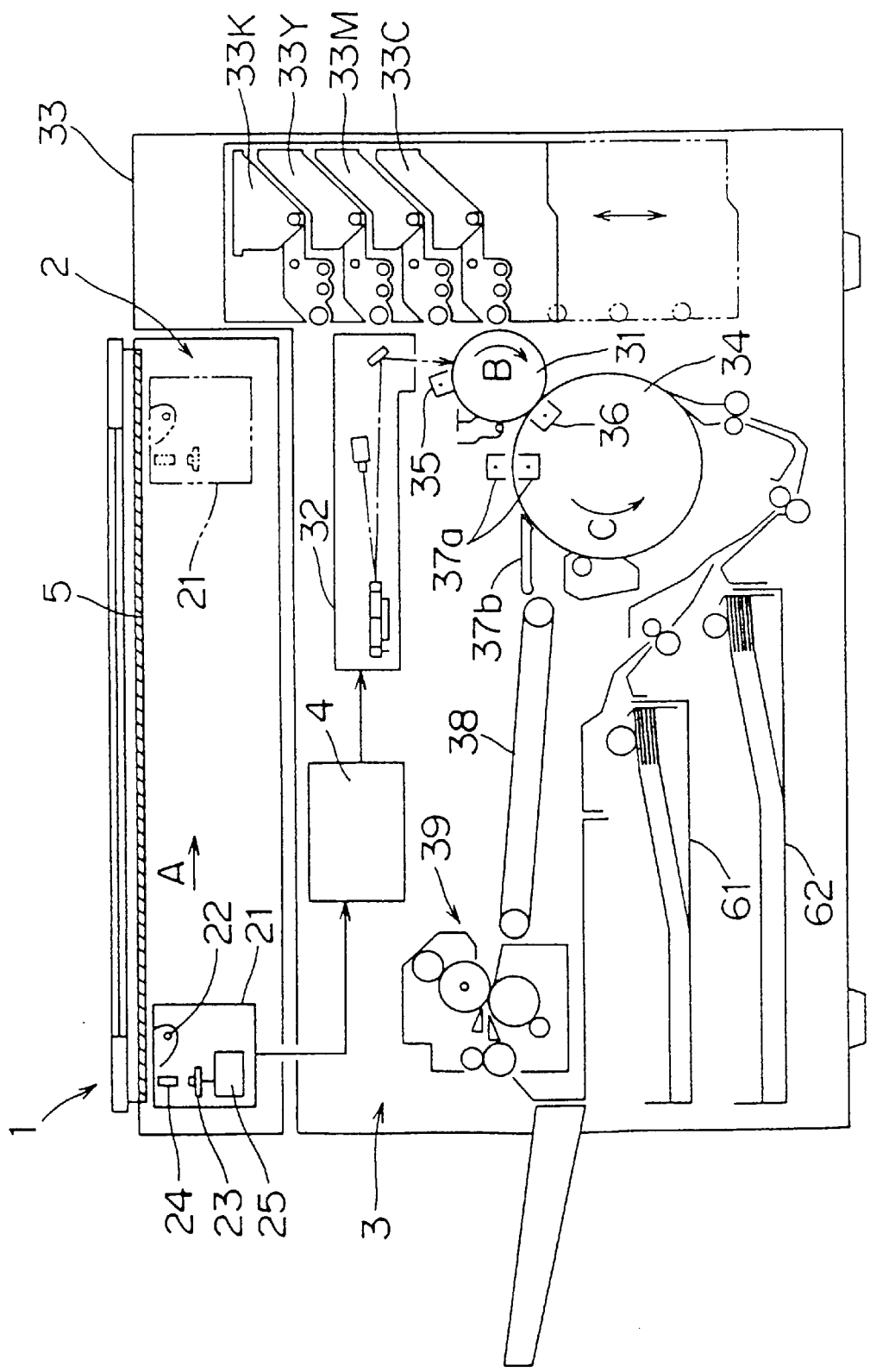
FIG. 1 is a schematic sectional view illustrating the internal construction of a digital color copying machine to which one embodiment of the present invention is applied.

FIG. 1 is a schematic sectional view illustrating the internal construction of a digital color copying machine to which one embodiment of the present invention is applied. The digital color copying machine includes a scanner section 2 for optically reading an original image, an image processing section 4 for processing the image read by the scanner section 2, and an output section 3 for reproducing the original image on a recording sheet on the basis of image data processed by the image processing section 4, which are all accommodated in a copying machine body 1 thereof.

On the top face of the copying machine body 1 is provided a transparent document platen 5 on which a document original to be copied is to be placed. The scanner section 2 is disposed in association with the document platen 5, and includes a scan reading section 21 reciprocally movable in a direction of an arrow A. The scan reading section 21 includes a light source 22 for illuminating the document original, a color CCD 23 for sensing light reflected from the document original for photo-electric conversion, a Selfoc® lens 24 for focusing an optical image of the document original on the CCD 23, and a conversion circuit 25 for converting an output of the CCD 23 into digital color image data. The color CCD 23 has color filters, for example, of red (R), green (G) and blue (B) for each pixel, and outputs analog image signals for RGB components of each pixel. The conversion circuit 25 converts the analog image signals outputted from the CCD 23 into digital color image data indicative of the densities of cyan (C), magenta (M) and yellow (Y) components.

The output section 3 electrophotographically forms an image by using toners of four colors, e.g., cyan, magenta, yellow and black (BK). More specifically, the output section 3 includes a photoreceptor drum 31, a laser scanning section 32 for forming an electrostatic latent image on the surface of the photoreceptor 31, a developing unit 33 for developing the electrostatic latent image formed on the surface of the photoreceptor 31 into a toner image, and a transfer drum 34.

During the image formation, the photoreceptor 31 is rotated at a constant rate in a direction of an arrow B in FIG. 1, and the transfer drum 34 is rotated at a constant rate in a direction of an arrow C. On the other hand, the laser scanning section 32 exposes the surface of the photoreceptor 31 to a laser beam modulated on the basis of the image data applied from the image processing section 4. Before the exposure, the surface of the photoreceptor 31 is uniformly charged by a main charger 35. Therefore, the formation of an electrostatic latent image corresponding to an image to be finally formed is achieved by the exposure to the laser beam. The developing unit 33 develops the electrostatic latent image into a toner image, which is transferred onto a paper sheet wound around the transfer drum 34 by the operation of a transfer unit 36.

In the digital color copying machine, the aforesaid operation is repeated four times. When cyan image data are inputted to the laser scanning section 32, for example, an electrostatic latent image for cyan image data is formed on the photoreceptor 31. Then, the electrostatic latent image for cyan is developed into a toner image with a cyan toner by means of a cyan developing unit 33C, and the toner image is transferred onto a paper sheet. Similarly, electrostatic latent images corresponding to magenta, yellow and black image data are developed by means of a magenta developing unit 33M, yellow developing unit 33Y and black developing unit 33K, respectively, and the resulting magenta, yellow and black toner images are transferred onto the paper sheet wound around the transfer drum 34.

The sheet bearing the four color toner images transferred thereon is removed from the transfer drum 34 by the operations of a separation discharger 37a, a separation claw 37b and the like, and then introduced into a fixing unit 39 through a transportation belt 38. The fixing unit 39 fixes toner particles on the sheet by heat and press, and then discharges the sheet outside the copying machine body 1. It is noted that reference numerals 61 and 62 are sheet feeding cassettes, from either of which a paper sheet is supplied to the transfer drum 34.

Figure 2:
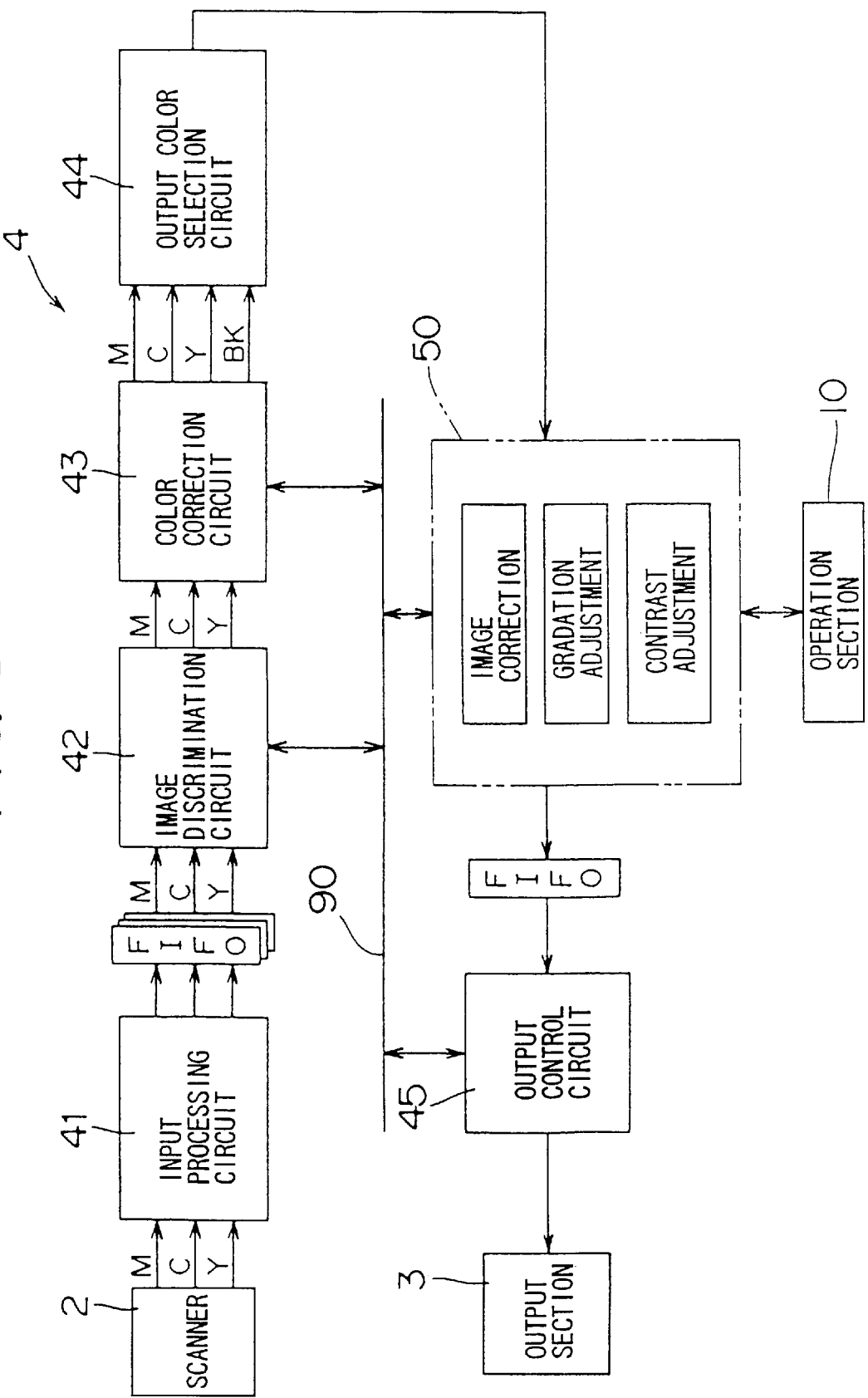
FIG. 2 is a block diagram for explaining the internal construction of an image processing section.

FIG. 2 is a block diagram for explaining the internal construction of the image processing section 4. C-, M- and Y-color image data outputted from the scanner section 2 on a pixel-by-pixel basis are applied in parallel to an input processing circuit 41. The input processing circuit 41 removes image data of a margin of a document original to prevent image formation on a margin of a sheet, and performs a process for adjusting an image formation position on the sheet. Further, the input processing section 41 judges on the basis of density levels of the C-, M- and Y-components whether the inputted image is a color image or a monochrome image.

Data outputted from the input processing circuit 41 are applied to an image discrimination circuit 42 via a FIFO (first-in first-out memory). The image discrimination circuit 42 judges which image area, among a character image area, a photographic area and a dotted image area, respective pixels belong to. The judgment result is applied to a color correction circuit 43, a microprocessor 50 and an output control circuit 48 via a data bus 90, and used for performing an appropriate process depending on the kinds of image areas to which the respective image pixels belong.

The color correction circuit 43 performs a color adjustment process, a black formation process and a color correction process. The color adjustment process is adapted to change the brightness, hue or saturation of the image. The black formation process is adapted to detect the minimum value among the image data of the C-, M- and Y-components. By multiplying the minimum value by a correction factor (e.g., 0.5 to 1.0), image data of a BK-component are generated. Then, the product of the minimum value and the correction factor is subtracted from the image data of the C-, M- and Y-components. Further, in the color correction process, the inputted image data of the C-, M- and Y-components are processed in consideration of the optical characteristics of the color filters of the CCD 23 and the spectral characteristics of C-, M- and Y-color toners.

In the digital color copying machine according to this embodiment, as will be described later, a full-color original image can be reproduced either as a full-color output image or as a monochrome output image such as of cyan, magenta, yellow, black, red, green or blue. When a predetermined signal is inputted to the color correction circuit 43 from an operation section 10 connected to the microprocessor 50 via the data bus 90, the color correction circuit 43 corrects the C-, M-, Y- and BK-image data to convert full-color image data into monochrome image data.

The C-, M-, Y- and BK-image data from the color correction circuit 43 are inputted to an output color selection circuit 44. The output color selection circuit 44 selects and outputs the C-, M-, Y- and BK-image data one by one in this order to the microprocessor 50.

In the output color selection circuit 44 and succeeding circuits, the image data are processed on a color-by-color basis. This is because, as described above, four monochrome images for four colors, i.e., C, M, Y and BK, are formed one by one when the copying operation is performed.

The microprocessor 50 has, for example, an image correction function for subjecting the inputted image data to an outline emphasis process for enhancing the clarity of the image and a softening process for reducing the stiffness of the image. To provide a precise output gradation, the microprocessor 50 has a gradation adjustment function for processing the inputted image data on the basis of the characteristics of the toners and the photoreceptor, and a contrast adjustment function for performing a process for altering the contrast of the image. These functions are realized by a software process to be performed by the microprocessor 50. The operation and construction of the microprocessor 50 will be detailed later.

The image data processed by the microprocessor 50 are applied to the output control circuit 45 via a FIFO. The output control circuit 45 generates a laser oscillation signal which is to be applied to the laser scanning section 32 of the output section 3.

The laser scanning section 32 has two laser output modes, for example, which employ different processes for expressing the gradation levels of an image. In one laser output mode, the gradation levels of an image to be formed are expressed on a single pixel basis (on a 1×1 matrix basis) and, for example, 1024 density gradation levels can be expressed. In the other laser output mode, the gradation levels of an image to be formed are expressed on a dual pixel basis (on a 1×2 matrix basis) and, if one pixel is expressed on 1024-level gradation scale, for example, 2048 density gradation levels can be expressed. The output control circuit 45 applies a laser oscillation signal to the laser scanning section 32 in accordance with either of the laser output modes.

Figure 3:
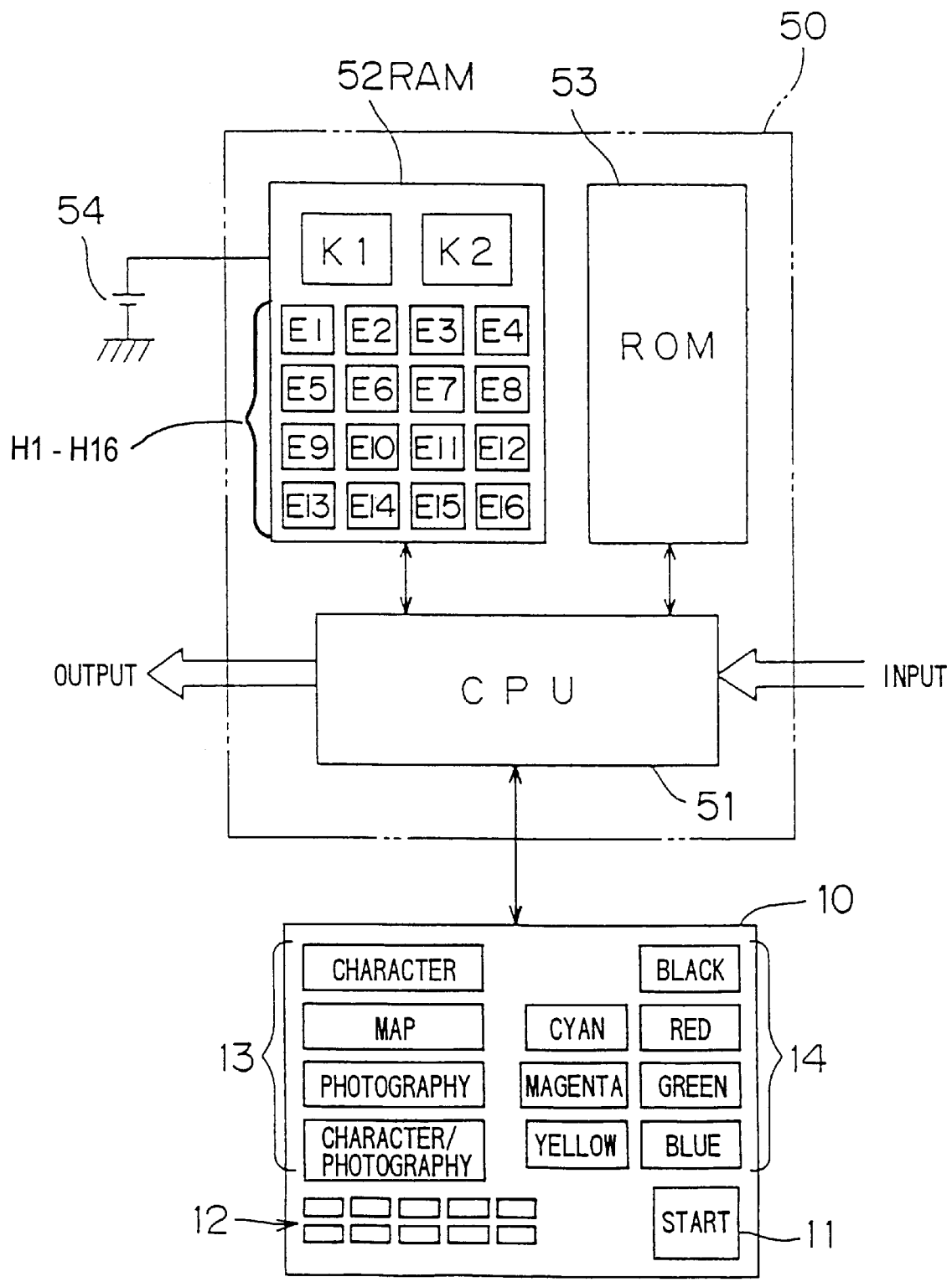
FIG. 3 is a block diagram schematically illustrating the construction of a microprocessor.

FIG. 3 is a block diagram schematically illustrating the construction of the microprocessor 50. The microprocessor 50 includes a CPU 51, a RAM 52 with a backup battery 54, and a ROM 53. The CPU 51 processes the image data inputted from the output color selection circuit 44 (see FIG. 2) on the basis of programs stored in the ROM 53. The CPU 51 is connected to the operation section 10 provided on the top face of the copying machine body 1 (see FIG. 1).

The operation section 10 includes a start key 11 for starting a copying operation, ten keys 12 for inputting the number of copies to be made and the like, image quality mode setting keys 13 for setting an image quality mode, and color mode setting keys 14 for setting a color mode.

The image quality mode setting keys 13 include, for example, a character mode key, a map mode key, a photography mode key, and a character/photography mode key. When one of the image quality mode setting keys 13 is pressed to select an image quality mode, an image is formed in accordance with the selected image quality mode. The output mode to be employed by the laser scanning section 32 is different depending on the selected image quality mode. When the character mode or the map mode is selected, the laser scanning section 32 employs the output mode for expressing the density of the image on 1024-level gradation scale. On the other hand, when the photography mode or the character/photography mode is selected, the laser scanning section 32 employs the output mode for expressing the density of the image on 2048-level gradation scale.

The color mode setting keys 14 are used when a full-color original image is to be reproduced as a monochrome image. More specifically, the color mode setting keys 14 include seven color mode keys, i.e., a cyan mode key, a magenta mode key, a yellow mode key, a black mode key, a red mode key, a green mode key and a blue mode key. By operating one of the seven color mode setting keys, a monochrome mode is selected which is adapted to form an image with the corresponding one of the seven colors. When none of the color mode setting keys 14 is pressed, the original image is reproduced as a full-color image.

Possible image modes to be selected by operating the image quality mode setting keys 13 and the color mode setting keys 14 are the following 32 modes: a character full-color mode, a character cyan mode, a character magenta mode, a character yellow mode, a character black mode, a character red mode, a character green mode, a character blue mode, a map full-color mode, a map cyan mode, a map magenta mode, a map yellow mode, a map black mode, a map red mode, a map green mode, a map blue mode, a photography full-color mode, a photography cyan mode, a photography magenta mode, a photography yellow mode, a photography black mode, a photography red mode, a photography green mode, a photography blue mode, a character/photography full-color mode, a character/photography cyan mode, a character/photography magenta mode, a character/photography yellow mode, a character/photography black mode, a character/photography red mode, a character/photography green mode, and a character/photography blue mode.

The CPU 51 performs different processes on the inputted image data in the aforesaid 32 image modes. In this embodiment, two reference tables K1 and K2 and 16 computation tables E1 to E16 are stored in the RAM 52, and an image corresponding to one of the 32 image modes is formed by using a reference table and/or a computation table in combination.

More specifically, only two output gradation reference curves respectively plotted such that excellent images can be formed in the character full-color mode and the photography full-color mode are stored in the form of reference tables K1 and K2 in the RAM 52. If the reference table K1 is used to produce output image data corresponding to the inputted image data, an image is formed in accordance with the character full-color mode. On the other hand, if the reference table K2 is used to produce output image data corresponding to the inputted image data, an image is formed in accordance with the photography full-color mode.

To form an image in accordance with image modes other than the character full-color mode and the photography full-color mode, a new output gradation curve corresponding to each of the modes is actually prepared by modifying one of the two output gradation reference curves on the basis of one or two of the 16 computation tables E1 to E16 (which will be detailed later). The inputted image data are processed on the basis of the output gradation curve thus prepared.

The computation table E1 is used when the map mode is selected. The computation table E2 is used when the character/photography mode is selected.

The computation tables E3 to E9 are used when the laser scanning section 32 employs the output mode for expressing an original image on 1024-level gradation scale, and correspond to the cyan mode, the magenta mode, the yellow mode, the black mode, the red mode, the green mode and the blue mode, respectively.

The computation tables E10 to E16 are used when the laser scanning section 32 employs the output mode for expressing an original image on 2048-level gradation scale, and correspond to the cyan mode, the magenta mode, the yellow mode, the black mode, the red mode, the green mode and the blue mode, respectively.

Figure 4:
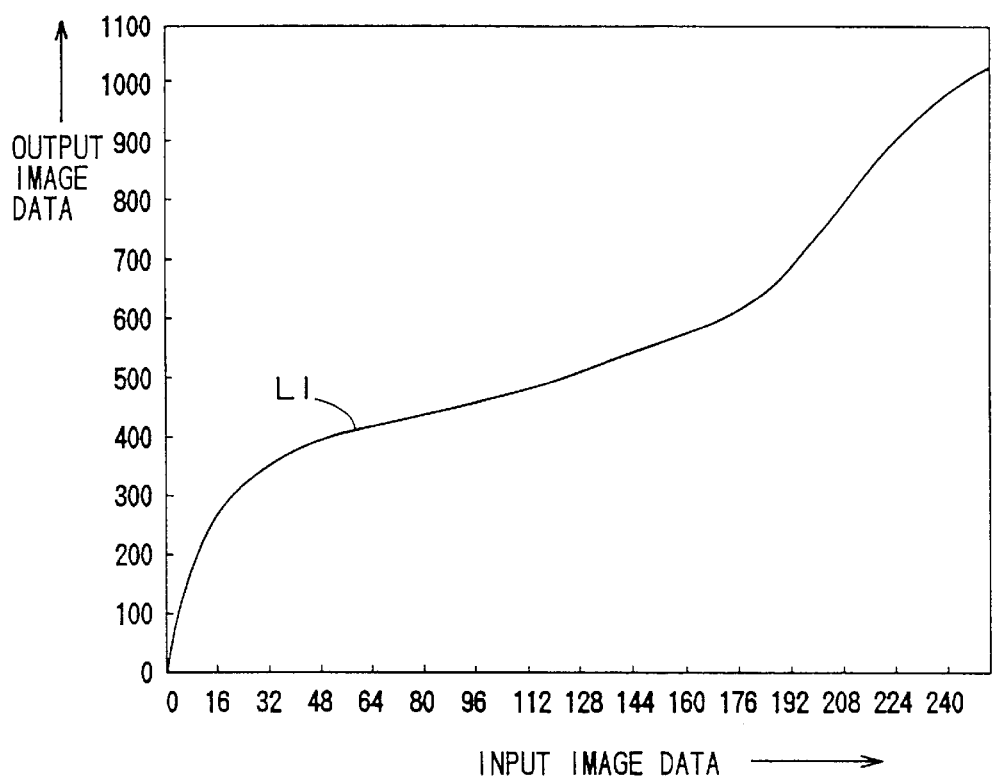
FIG. 4 is a graphical representation illustrating one exemplary output gradation reference curve corresponding to a reference table.

FIG. 4 is a graphical representation illustrating one exemplary output gradation reference curve L1 corresponding to the reference table K1. The input value and the output value are plotted as abscissa and ordinate, respectively. When the character mode key among the image mode setting keys 13 is pressed, the laser scanning section 32 employs the output mode for expressing an image density on 1024-level gradation scale as described above. Therefore, an upper limit input value "255" corresponds to an upper limit output value "1023". Though not shown, an upper limit input value of the output gradation reference curve corresponding to the reference table K2 is "255", which corresponds to an upper limit output value "2047". More specifically, when the reference table K1 is used, the inputted data of 8 bits (256 gradation levels) are converted into data of 10 bits (1024 gradation levels). On the other hand, when the reference table K2 is used, the inputted data of 8 bits (256 gradation levels) are converted into data of 11 bits (2048 gradation levels).

FIG. 5 is a diagram illustrating one exemplary computation table. In FIG. 5, values stored in respective addresses of the table are arranged in a matrix-like array. As shown, the storage address in each column increases from the left to the right by one, while the storage address in each row increases from the top to the bottom by 16.

For example, as indicated by a reference numeral 80, an output value in an address "3" is "3", and an output value in an address "4" is also "3". That is, the output values in different addresses are the same. Therefore, where the computation table is addressed on the basis of inputted data "3" and "4" and the resulting values are applied as addresses to the reference table to determine output data, the inputted data "3" and "4" give output data having the same value. A process for outputting the same output data for input data having different values in the aforesaid manner is hereinafter referred to as "data expansion".

Further, as indicated by a reference numeral 81, an output value for an input value "123" is "88", and an output value for an input value "124" is "90". That is, no input value corresponds to an output value "89". Therefore, where the computation table is addressed on the basis of the inputted data and the resulting value is applied as an address to the reference table to determine output data, an address "89" in the reference table is never designated. Thus, no output data corresponds to the address "89". A process for increasing the change ratio of the output data to the input data in the aforesaid manner is hereinafter referred to as "data compression".

In the computation table in FIG. 5, one output data value is added for every three input data values in a range between an input data value "0" and an input data value "99". This process is called "4/3 data expansion". On the other hand, one output data value is omitted for every five input values in a range between an input data value "100" and an input data value "199". This process is called "4/5 data compression". By processing the inputted data on the basis of the computation table, portions of the reference table are expanded or compressed so that the reference table is modified to conform to the selected image quality mode and the like. The number of the data compression operations is equal to the number of the data expansion operations and, hence, 256 data in total are contained in the computation table.

Figure 6:
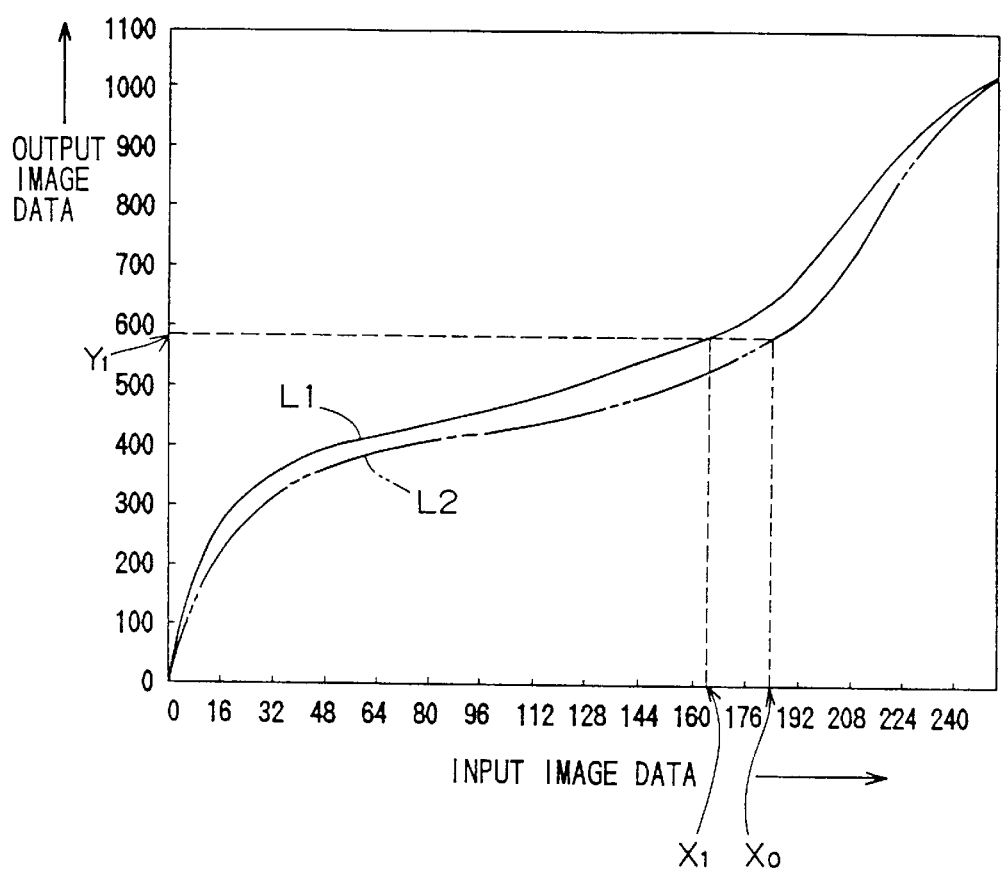
FIG. 6 is a graphical representation for explaining processes for modifying an output gradation reference curve with the use of a computation table and producing output image data corresponding to values plotted on a new output gradation curve thus obtained.

FIG. 6 is a graphical representation for explaining processes for modifying an output gradation reference curve L1 with the use of a computation table and preparing output image data corresponding to values plotted on a new output gradation curve L2 thus obtained. For example, it is assumed that image data having a value "$X_0$" is inputted to the CPU 51. The inputted image data "$X_0$" is applied as an address to the computation table. The addressing gives a value "$X_1$". Then, an output value plotted on the output gradation reference curve L1 in correspondence to the value "$X_1$" is obtained. The output value "$Y_1$" thus obtained corresponds to the inputted image data "$X_0$" plotted on the output gradation curve L2.

Thus, output values for the respective input image data are successively determined to prepare the output gradation curve L2. In this embodiment, however, the output gradation curve L2 is not actually prepared, but the values to be possibly plotted on the curve L2 in correspondence to the image data inputted to the CPU 51 are determined.

Referring to FIG. 6, in a range where the input image data have smaller values, the change ratio of the output image data to the input image data on the output gradation curve L2 is smaller than that on the output gradation reference curve L1. This results from the data expansion in the computation table. In a range where the input image data have larger values, the change ratio of the output image data to the input image data on the output gradation curve L2 is greater than that on the output gradation reference curve L1. This results from the data compression in the computation table.

Figure 8:
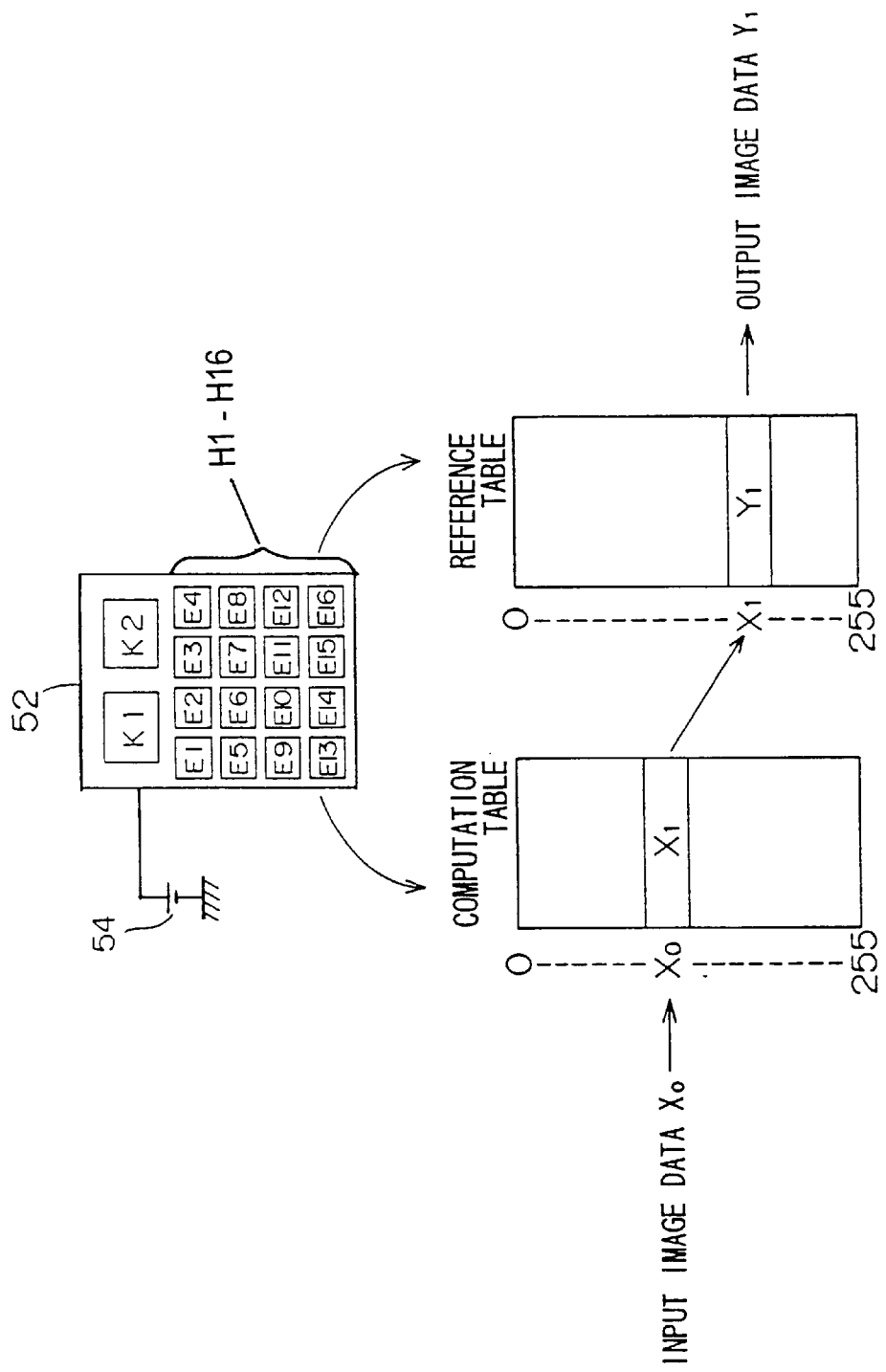
FIG. 8 is a conceptual diagram for explaining an operation to be performed by the CPU when output image data are produced by using one reference table and one computation table.
Figure 9:
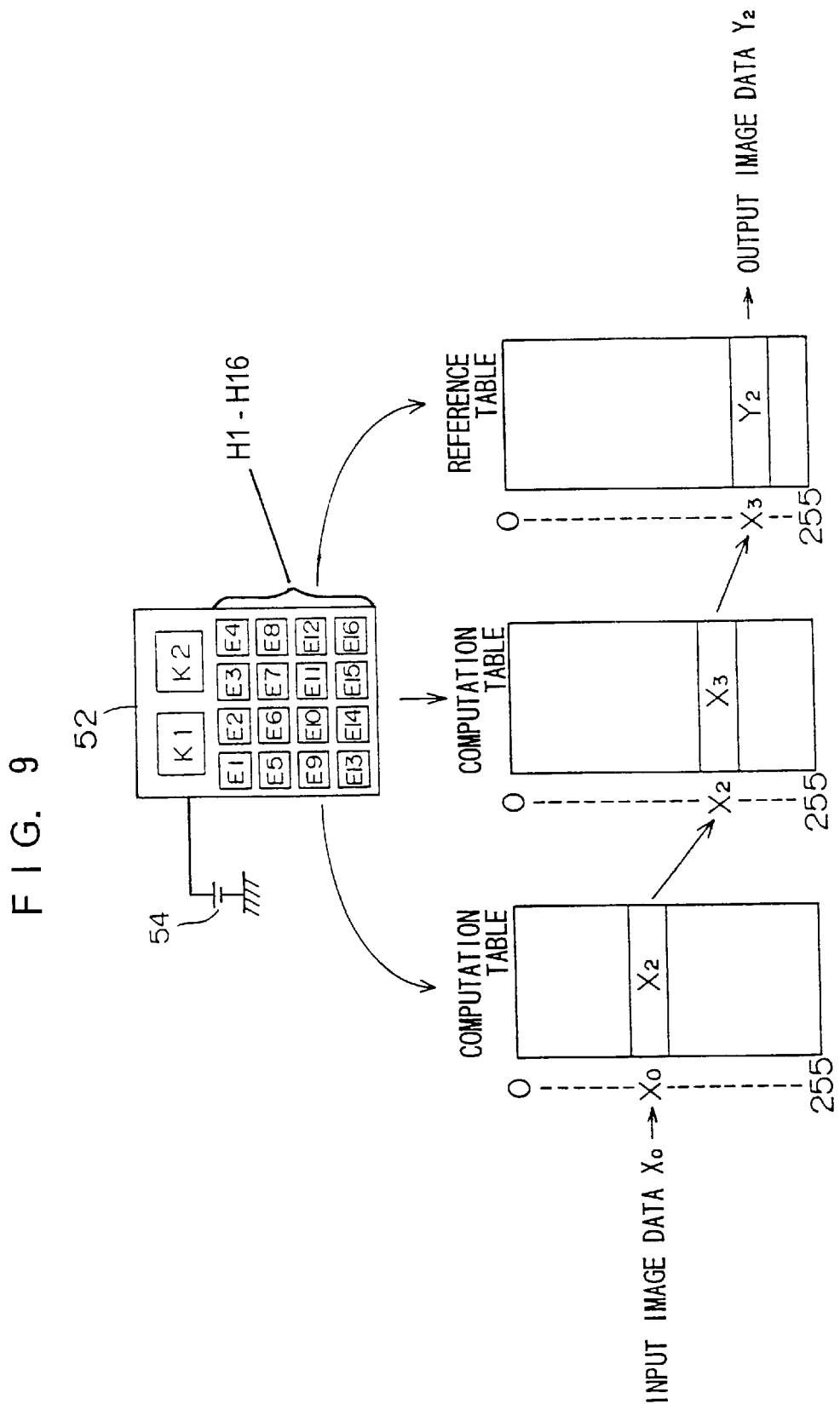
FIG. 9 is a conceptual diagram for explaining an operation to be performed by the CPU when output image data are produced by using one reference table and two computation tables.

FIGS. 7 to 9 are diagrams for explaining operations to be performed by the CPU 51 when output image data are prepared. When a user selects an image quality mode and a color mode to start the copying operation, the CPU 51 examines the outputs from the image quality mode key 13 and the color mode key 14 to determine the selected modes. The CPU 51 processes the image data inputted thereto in accordance with the selected modes.

Referring to FIG. 7, when the character mode key among the image quality setting keys 13 is pressed and none of the color mode setting keys 14 is pressed (i.e., the character full-color mode is selected), the reference table K1 is addressed on the basis of the inputted image data $X_0$. When the photography mode key among the image quality setting keys 13 is pressed and none of the color mode setting key 14 is pressed (i.e., the photography full-color mode is selected), the reference table K2 is addressed on the basis of the inputted image data $X_0$. On the basis of the addressing, image data $Y_0$ suitable for the selected mode are provided.

Referring to FIG. 8, an explanation will be given to the flow of a process to be performed when the map full-color mode, the character/photography full-color mode, the character monochrome mode or the photography monochrome mode is selected. The reference tables K1 and K2 stored in the RAM 52 are adapted to form an excellent image in the character full-color mode and the photography full-color mode, respectively. In the map full-color mode and the character/photography full-color mode which are different from the character full-color mode and the photography full-color mode, respectively, in terms of the image quality mode, and in the character monochrome mode and photography monochrome mode which are different from the character full-color mode and the photography full-color mode, respectively, in terms of the color mode, a suitable one of the conversion tables is employed to determine output image data.

The CPU 51 first examines the inputs from the image mode setting key 13 and the color mode setting key 14, and then selects a computation table corresponding to the designated mode from the computation tables E1 to E16.

When the map full-color mode or the character/photography full-color mode is designated, the map mode computation table E1 or the character/photography computation table E2 is selected respectively.

When the CPU 51 judges that the character cyan mode is designated, the cyan mode computation table E3 is selected. Similarly, when the character magenta mode, the character yellow mode, the character black mode, the character red mode, the character green mode or the character blue mode is designated, the magenta mode computation table E4, the yellow mode computation table E5, the black mode computation table E6, the red mode computation table E7, the green mode computation table E8 or the blue mode computation table E9 is selected respectively.

When the CPU 51 judges that the photography cyan mode is designated, the cyan mode computation table E10 is selected. Similarly, when the photography magenta mode, the photography yellow mode, the photography black mode, the photography red mode, the photography green mode or the photography blue mode is designated, the magenta mode computation table E11, the yellow mode computation table E12, the black mode computation table E13, the red mode computation table E14, the green mode computation table E15 or the blue mode computation table E16 is selected respectively. Then, an address in the selected computation table is designated on the basis of the inputted image data $X_0$. The addressing allows data $X_1$ stored in the designated address to be outputted.

The data $X_1$ thus provided is applied as an address to one of the reference tables K1 and K2 corresponding to the designated image quality mode. When the character mode or the map mode is designated, the reference table K1 for the character full-color mode is addressed. When the photography mode or the character/photography mode is designated, the reference table K2 for the photography full-color mode is addressed. Data $Y_1$ stored in the address of the reference table K1 or K2 is fetched as output image data corresponding to the inputted image data $X_0$ and applied to the output section 3.

Thus, output image data for 16 modes can be provided by using one of the two reference tables K1 and K2 and one of the 16 computation tables E1 to E16 in combination.

Referring to FIG. 9, the flow of a process to be performed when any one of the seven map monochrome modes and seven character/photography monochrome modes is selected. In a map monochrome mode or a character/photography monochrome mode, two of the computation tables are used to determine output image data in the following manner.

Image data $X_0$ inputted to the CPU 51 is applied as an address to the map mode computation table E1 in the map monochrome mode, or to the character/photography mode computation table E2 in the character/photography monochrome mode. Thus, data $X_2$ stored in the address is provided.

In turn, a second computation table is addressed on the basis of the data $X_2$. As the second computation table, a table corresponding to the selected color mode is selected from the computation tables E3 to E16.

More specifically, when the CPU 51 judges that the map cyan mode is designated, the cyan mode computation table E3 is selected. Similarly, when the map magenta mode, the map yellow mode, the map black mode, the map red mode, the map green mode or the map blue mode is designated, the magenta mode computation table E4, the yellow mode computation table E5, the black mode computation table E6, the red mode computation table E7, the green mode computation table E8 or the blue mode computation table E9 is selected respectively.

When the CPU 51 judges that the character/photography cyan mode is designated, the cyan mode computation table E10 is selected. Similarly, when the character/photography magenta mode, the character/photography yellow mode, the character/photography black mode, the character/photography red mode, the character/photography green mode or the character/photography blue mode is designated, the magenta mode computation table E11, the yellow mode computation table E12, the black mode computation table E13, the red mode computation table E14, the green mode computation table E15 or the blue mode computation table E16 is selected respectively.

On the basis of the data $X_2$, an address in the selected computation table is designated. The addressing allows data $X_3$ stored in the designated address to be outputted.

By addressing the character full-color mode reference table K1 in the map monochrome mode or the photography full-color mode reference table K2 in the character/photography monochrome mode on the basis of the data $X_3$, data $Y_2$ stored in the address of the corresponding reference table K1 or K2 can be provided. The data $Y_2$ is employed as output image data corresponding to the inputted image data $X_0$.

Thus, output image data for 14 modes can be provided by using one of the reference tables K1 and K2, one of the computation tables E1 and E2 and one of the 16 computation tables E3 to E16 in combination.

Therefore, output image data for 32 image modes can be provided. Possible combinations of the reference tables and the computation tables for the respective image modes described above are listed in Table 1.

TABLE 1

| Image mode | Reference table | Computation table | Computation table |
|---|---|---|---|
| Character full-color | K1 | | |
| Map full-color | K1 | E1 | |
| Character cyan | K1 | E3 | |
| Character magenta | K1 | E4 | |
| Character yellow | K1 | E5 | |
| Character black | K1 | E6 | |
| Character red | K1 | E7 | |
| Character green | K1 | E8 | |
| Character blue | K1 | E9 | |
| Map cyan | K1 | E1 | E3 |
| Map magenta | K1 | E1 | E4 |
| Map yellow | K1 | E1 | E5 |
| Map black | K1 | E1 | E6 |
| Map red | K1 | E1 | E7 |
| Map green | K1 | E1 | E8 |
| Map blue | K1 | E1 | E9 |
| Photography full-color | K2 | | |
| Character/photography full-color | K2 | E2 | |
| Photography cyan | K2 | E10 | |
| Photography magenta | K2 | E11 | |
| Photography yellow | K2 | E12 | |
| Photography black | K2 | E13 | |
| Photography red | K2 | E14 | |
| Photography green | K2 | E15 | |
| Photography blue | K2 | E16 | |
| Character/photography cyan | K2 | E2 | E10 |
| Character/photography magenta | K2 | E2 | E11 |
| Character/photography yellow | K2 | E2 | E12 |
| Character/photography black | K2 | E2 | E13 |
| Character/photography red | K2 | E2 | E14 |
| Character/photography green | K2 | E2 | E15 |
| Character/photography blue | K2 | E2 | E16 |

The output gradation reference curves are prepared in the following manner by using predetermined test image data stored in the ROM 53. More specifically, image formation is performed on the basis of the test image data in a state where an initial output gradation curve is loaded in the RAM 52. That is, the test image data are corrected on the basis of the initial output gradation curve, and then the corrected data are applied to the output section 3 for formation of a test image. The test image is, for example, a so-called gray-scale image having a plurality of regions respectively having different density gradation levels. The test image is read by the scanner section 2. On the basis of the read data thus obtained, the output gradation reference curve is prepared such that an image having a proper density distribution corresponding to the inputted image data can be formed.

More specifically, a reference output curve defining output gradation levels in correspondence to inputted image data is stored in the ROM 53. By referring to the reference output curve, the read data and the initial output gradation curve, points to be plotted on the output gradation reference curve are determined. The points are linked by way of interporation by lines or quadratic curves to provide a simple increase curve for the preparation of the output gradation reference curve.

It is noted that a straight line defining a proportional relationship between the input image data and the output image data may be used as the initial output gradation curve. If the output gradation reference curve is already loaded in the RAM 52, the output gradation reference curve may be used as the initial output gradation curve.

For preparation of the computation tables, the image formation is performed on the basis of the aforesaid test image data in a state where the output gradation reference curve is loaded in the RAM 52 and each of the modes is designated from the operation section 10. Thus, a test image is formed. By using the test image, an output gradation curve suitable for each mode is prepared with reference to a predetermined output reference curve corresponding to the mode in substantially the same manner as for the preparation of the output gradation reference curve. By comparing the output gradation curve with the aforesaid output gradation reference curve, the computation table is prepared which is used to obtain the output gradation curve suitable for the mode by modifying the output gradation reference curve.

The preparation of the output gradation reference curve may be achieved by copying a gray-scale document original and then visually comparing the document original with a copy thereof. Further, the preparation of the computation tables may be based on a visual comparison of a document original suitable for each mode with a copy thereof which is obtained in a state where the output gradation reference curve is loaded in the RAM 52.

As described above, the generation of image data for each of the 32 modes which are possibly offered by employing the four image quality modes (character, map, photography and character/photography) and the eight color modes (full-color, C, M, Y, BK, R, G and B) can be achieved by using in combination one of the reference tables K1 and K2 and one or two of the computation tables E1 to E16 stored in the RAM 52 for the processing of inputted image data. Therefore, there is no need to store tables indicative of 32 output gradation curves corresponding to the 32 modes in the RAM 52.

More specifically, in this embodiment which involves the storage of one table (reference table K1) containing data of 10 bits and one table (reference table K2) containing data of 11 bits and 16 tables (computation tables E1 to E16) containing data of 8 bits, the amount of information required for the image quality adjustment can be reduced by a ratio calculated from the following equation in comparison with the prior art which involves the storage of 16 tables (for the character mode and the map mode) containing data of 10 bits and 16 tables (for the photography mode and the character/photography mode) containing data of 11 bits.

$$\frac{10+11+8\times16}{10\times16+11\times16} = \frac{149}{336}$$

Therefore, the storage of the tables does not require a large storage area in the RAM 52. Even if the number of image modes is increased, the storage capacity of the RAM 52 is not threatened. In other words, a smaller capacity RAM can be used as the RAM 52.

Since a smaller number of tables are employed, the installation of the respective tables in the machine is easy, thereby improving the productivity. Further, the table correction which is required due to a time-related change in the mechanical characteristics of the machine is performed only on the two reference tables K1 and K2, because a time-related change in the relation between the tables for the respective modes is considered to be negligible. This facilitates the table correction to be performed by a technical service person.

There will next be described another embodiment of the present invention. Although the first embodiment described above is adapted to employ values on an output gradation curve prepared by compressing or expanding data in the reference tables K1 and K2 on the basis of the 16 computation tables E1 to E16 stored in the RAM 52 (see FIG. 3) for the generation of output image data, this embodiment does not employ the computation tables, but is adapted to prepare a table for an output gradation curve corresponding to a designated mode by compressing and expanding data in the reference tables K1 and K2 on the basis of a computation method data stored in the RAM 52. In this embodiment, output image data corresponding to the inputted data is determined on the basis of the table thus prepared.

Figure 10:
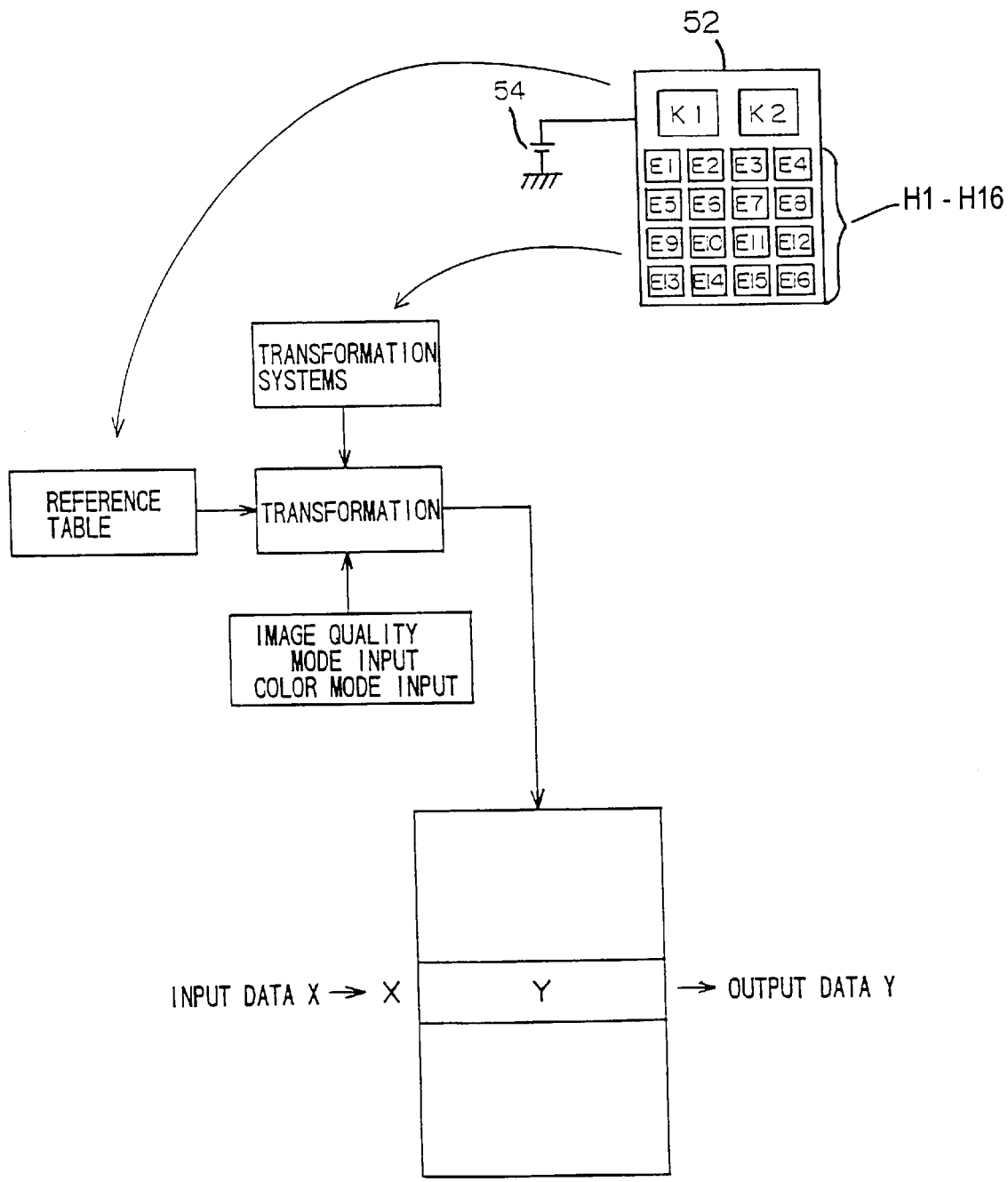
FIG. 10 is a conceptual diagram for explaining the flow of a process to be performed by a CPU in accordance with another embodiment of the present invention.

FIG. 10 is a conceptual diagram for explaining the flow of a process to be performed by the CPU 51 in accordance with this embodiment. The aforesaid character full-color mode reference table K1 and photography full-color mode reference table K2, and 16 computation method data H1 to H16 are stored in the RAM 52. The computation method data H1 to H16 each indicate a method for modifying an output gradation reference curve defined by the reference table K1 or K2 into an output gradation curve corresponding to each of the modes. The computation method data H1 to H16 correspond to the computation tables E1 to E16, respectively, which are employed in the first embodiment. More specifically, the computation method data H1 to H16 are stored in the RAM 52 in place of the computation tables E1 to E16.

Referring to FIGS. 3 to 10, when the copying operation is started, the CPU 51 examines the inputs from the image quality mode setting key 13 and the color mode setting key 14 of the operation section 10, and determines which image mode is designated. On the basis of the designated mode, a reference table and computation method data to be employed are selected.

For the character full-color mode, only the character full-color mode reference table K1 is selected. For the photography full-color mode, only the photography full-color mode reference table K2 is selected.

For the following image modes, one of the reference tables K1 and K2 and one or two of the computation method data H1 to H16 are selected. More specifically, the reference table K1 and a map mode computation method data H1 are selected for the map full-color mode. The reference table K2 and a character/photography mode computation method data H2 are selected when the character/photography mode key is pressed.

For the character monochrome mode, in addition to the reference table K1, a cyan mode computation method data H3, a magenta mode computation method data H4, a yellow mode computation method data H5, a black mode computation method data H6, a red mode computation method data H7, a green mode computation method data H8 or a blue mode computation method data H9 is selected depending on a selected color mode (cyan mode, magenta mode, yellow mode, black mode, red mode, green mode or blue mode).

For the photography monochrome mode, in addition to the reference table K2, a cyan mode computation method data H10, a magenta mode computation method data H11, a yellow mode computation method data H12, a black mode computation method data H13, a red mode computation method data H14, a green mode computation method data H15 or a blue mode computation method data H16 is selected depending on a selected color mode (cyan mode, magenta mode, yellow mode, black mode, red mode, green mode or blue mode).

For the map monochrome mode, in addition to the reference table K1 and the map mode computation method data H1, the cyan mode computation method data H3, the magenta mode computation method data H4, the yellow mode computation method data H5, the black mode computation method data H6, the red mode computation method data H7, the green mode computation method data H8 or the blue mode computation method data H9 is selected depending on a selected color mode (cyan mode, magenta mode, yellow mode, black mode, red mode, green mode or blue mode).

For the character/photography monochrome mode, in addition to the reference table K2 and the character/photography mode computation method data H2, the cyan mode computation method data H10, the magenta mode computation method data H11, the yellow mode computation method data H12, the black mode computation method data H13, the red mode computation method data H14, the green mode computation method data H15 or the blue mode computation method data H16 is selected depending on a selected color mode (cyan mode, magenta mode, yellow mode, black mode, red mode, green mode or blue mode).

The reference table K1 or K2 thus selected is modified in accordance with the one or two computation method data thus selected for preparation of a new table, which is developed in the RAM 52. Image data X inputted to the CPU 51 is applied as an address to the table loaded in the RAM 52. The addressing allows data Y stored in the address to be applied as output image data to the output section 3.

Next, an explanation will be given to a process for modifying the reference table K1 or K2 (hereinafter referred to generally as "reference table K") in accordance with a selected computation method data. Like the first embodiment, the reference table K is modified by data compression and expansion. The computation method data H1 to H16 (hereinafter referred to generally as "computation method data H") determines which output data in the reference table K are to be compressed or expanded.

The computation method data H specifies data ranges to be subjected to the data compression and expansion, for example, "output data corresponding to input data having values ranging from "0" to "99" in the reference table K are to be subjected to 3/4 data compression" or "output data corresponding to input data having values ranging from "100" to "199" are to be subjected to 5/4 data expansion". On the basis of such specifications, the data compression and expansion are carried out.

Where five output data values "a", "b", "c", "d" and "e" corresponding to five successive input data in the reference table K are to be compressed into four output data, for example, a difference "b-a", "c-b", "d-c" or "e-d" between each adjacent pair of data is determined. Data which give the smallest difference are used for the data reduction, which is achieved in the following manner. Where a difference "c-b" is the smallest, for example, the data values "b" and "c" are deleted, and then an average "(b+c)/2" of the data values "b" and "c" is inserted instead. That is, the data modification gives a sequence of output data values "a, (b+c)/2, d, e". If the differences between the adjacent data pairs are all the same, the last data value "e" is deleted.

Where four data values "b", "c", "d" and "e" out of six output data values "a", "b", "c", "d", "e" and "f" corresponding to six successive input data in the reference table K are to be expanded into five data, a difference "c-b", "d-c" or "e-d" between each adjacent pair of data is determined like the aforesaid compression process. Then, a data value is inserted between data which give the greatest difference in the following manner. Where a difference "d-c" is the greatest, for example, an average "(c+d)/2" of the data values "c" and "d" is inserted therebetween. That is, the data modification gives a sequence of five output data values "b, c, (c+d)/2, d, e". If the differences between the adjacent data pairs are all the same, an average "(e+f)/2" of the data values "e" and "f" is added after the last data value "e".

Thus, by the data compression and expansion in accordance with the computation method data H, the reference table K is modified into a table for an output gradation curve suitable for the selected mode. Therefore, the amount of information required for changing the image quality can be reduced like the first embodiment. The first embodiment in which the data compression and expansion are respectively achieved by the decreasing and increasing of one data value, may provide for a less smoothly varying output gradation curve. The second embodiment, on the other hand, achieves the modification of the reference table K by determining an appropriate data position for insertion of an average of two data values or replacement of a data value in the reference table K, thereby providing for a smoothly varying output gradation curve.

Therefore, where the CPU 51 offers a high processing rate such that a table for an output gradation curve can be developed quickly, it is preferred that the output gradation curve for the selected mode is prepared in accordance with the second embodiment.

While the embodiments of the present invention have thus been described, the invention is not limited to the aforesaid embodiments. Although the present invention is applied to the digital color copying machine in the aforesaid embodiments, the invention can be applied, for example, to image processing and like processes to be performed by personal computers.

In the aforesaid embodiments, the laser scanning section 32 employs two output modes which are respectively adapted to express the density levels of an image to be formed on 1024-level gradation scale and on 2048-level gradation scale, but may employ another mode adapted to express the density levels on a different gradation scale. In such a case, the reference table stored in the RAM 52 should be modified in accordance with the output mode.

Although the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

What is claimed is:

1. An image data processing apparatus that is adapted to process received image data in accordance with a selected one of a plurality of image modes and provide the processed data as an output, the image data processing apparatus comprising:

selective input means for selecting any one of the plurality of image modes;

output gradation reference curve storage means storing therein an output gradation reference curve;

computation data storage means storing therein computation data that is to be used for computing values to be plotted on an output gradation curve suitable for each of the image modes on the basis of the output gradation reference curve; and data processing means for processing received data in accordance with the image mode selected by the selective input means on the basis of the output gradation reference curve stored in the output gradation reference curve storage means and the computation data stored in the computation data storage means;

wherein the computation data storage means is adapted to be addressed on the basis of the received data, and stores therein the computation data in the form of a plurality of computation tables from which addressed data is generated;

wherein the output gradation reference curve storage means is adapted to be addressed on the basis of data generated by any of the computation tables, and stores therein the output gradation reference curve in the form of a table from which addressed data is generated; and wherein the data processing means selects one of the computation tables which corresponds to the image mode selected by the selective input means, and applies the received image data as an address to the selected computation table.

2. An image data processing apparatus as set forth in claim 1, wherein the data processing means, which employs plural computation tables in combination for at least one image mode, applies the received image data as an address to one of the plural computation tables, and applies data generated by the one computation table as an address to another computation table.

3. An image data processing apparatus as set forth in claim 1, wherein the computation tables are each designed such that data corresponding to input data within one range are compressed and data corresponding to input data within another range are expanded.

4. An image data processing apparatus as set forth in claim 3, wherein the computation tables are each designed such that adjacent input data located in pairs at predetermined data intervals in the range in which the input data are to be subjected to data expansion each provide equivalent output data, and adjacent input data located in pairs at predetermined data intervals in the range in which the input data are to be subjected to data compression respectively provide different output data, a difference between which is greater than a difference between the adjacent input data.

5. An image data processing apparatus that is adapted to process received image data in accordance with a selected one of a plurality of image modes and provide the processed data as an output, the image data processing apparatus comprising:

selective input means for selecting any one of the plurality of image modes;

output gradation reference curve storage means storing therein an output gradation reference curve;

computation data storage means storing therein computation data that is to be used for computing values to be plotted on an output gradation curve suitable for each of the image modes on the basis of the output gradation reference curve; and data processing means for processing received data in accordance with the image mode selected by the selective input means on the basis of the output gradation reference curve stored in the output gradation reference curve storage means and the computation data stored in the computation data storage means;

wherein the computation data storage means stores therein as the computation data a plurality of transformation method data for transforming the output gradation reference curve into an output gradation curve corresponding to an image mode; and wherein the data processing means includes output gradation curve preparation means for reading at least one of the transformation method data corresponding to the image mode selected by the selective input means and preparing an output gradation curve for the selected image mode on the basis of the read transformation method data and the output gradation reference curve, and means for correcting the received image data on the basis of the output gradation curve thus prepared.

6. An image data processing apparatus as set forth in claim 5, wherein the output gradation reference curve storage means stores therein the output gradation reference curve in the form of a reference table including a set of output data arranged in increasing order of the magnitude of input data; and wherein the output gradation curve preparation means determines a difference between each adjacent pair of output data in a sequence of at least three output data in the reference table and inserts between a pair of output data giving a greatest difference an average of the pair of the output data for data expansion.

7. An image data processing apparatus as set forth in claim 5, wherein the transformation method data are each designed such that data corresponding to input data within one range are compressed and data corresponding to input data within another range are expanded.

8. An image data processing apparatus as set forth in claim 5, wherein the output gradation reference curve storage means stores therein the output gradation reference curve in the form of a reference table including a set of output data arranged in increasing order of a magnitude of input data; and wherein the output gradation curve preparation means determines a difference between each adjacent pair of output data in a sequence of at least three output data in the reference table and replaces a pair of output data giving a smallest difference with an average of the pair of output data for data compression.

9. An image data processing apparatus that is adapted to process received image data in accordance with a selected one of a plurality of image modes and provide the processed data as an output the image data processing apparatus comprising:

selective input means for selecting any one of the plurality of image modes;

output gradation reference curve storage means storing therein an output gradation reference curve;

computation data storage means storing therein computation data that is to be used for computing values to be plotted on an output gradation curve suitable for each of the image modes on the basis of the output gradation reference curve; and data processing means for processing received data in accordance with the image mode selected by the selective input means on the basis of the output gradation reference curve stored in the output gradation reference curve storage means and the computation data stored in the computation data storage means;

wherein the selective input means is capable of selecting any of the plurality of image modes that is offered by employing any one of image quality modes and any one of color modes in combination, the image quality mode including a character mode, a map mode, a photography mode, and a character/photography mode, the color modes including a full-color mode and a plurality of monochrome modes.

10. An image data processing apparatus as set forth in claim 9, wherein the output gradation reference curve storage means stores therein two output gradation reference curves respectively corresponding to a character full-color mode and a photography full-color mode; and wherein the computation data storage means stores therein the computation data that is necessary and sufficient for preparing output gradation curves on the basis of either one of the two output gradation reference curves for any one of the plurality of image modes, except the character full-color mode and the photography full-color mode, which image modes are offered by employing any one of the image quality modes and any one of the color modes in combination.

11. An image forming apparatus for processing received image data in accordance with a selected one of a plurality of image modes and forming an image on the basis of the received image data thus processed, the image forming apparatus comprising:

selective input means for selecting any one of the plurality of image modes;

output gradation reference curve storage means storing therein an output gradation reference curve;

computation data storage means storing therein computation data that is to be used for computing values to be plotted on an output gradation curve suitable for each of the image modes on the basis of the output gradation reference curve;

data processing means for processing the received data in accordance with the image mode selected by the selective input means on the basis of the output gradation reference curve stored in the output gradation reference curve storage means and the computation data stored in the computation data storage means, and generating the processed data; and image forming means for forming an image on the basis of the data generated by the data processing means;

wherein the computation data storage means stores therein as the computation data a plurality of transformation method data for transforming the output gradation reference curve into an output gradation curve corresponding to an image mode; and wherein the data processing means includes output gradation curve preparation means for reading at least one of the transformation method data corresponding to the image mode selected by the selective input means and preparing an output gradation curve for the selected image mode on the basis of the read transformation method data and the output gradation reference curve, and means for correcting the received image data on the basis of the output gradation curve thus prepared.

12. An image forming apparatus as set forth in claim 11, wherein the transformation method data are each designed such that data corresponding to input data within one range are compressed and data corresponding to input data within another range are expanded;

wherein the output gradation reference curve storage means stores therein the output gradation reference curve in the form of a reference table including a set of output data arranged in increasing order of the magnitude of input data;

wherein the output gradation curve preparation means determines a difference between each adjacent pair of output data in a sequence of at least three output data in the reference table and replaces a pair of output data giving a smallest difference with an average of the pair of output data for data compression; and wherein the output gradation curve preparation means determines a difference between each adjacent pair of output data in a sequence of at least three output data in the reference table and inserts between a pair of output data giving a greatest difference an average of the pair of the output data for data expansion.

13. An image forming apparatus for processing received image data in accordance with a selected one of a plurality of image modes and forming an image on the basis of the received image data thus processed, the image forming apparatus comprising:

selective input means for selecting any one of the plurality of image modes;

output gradation reference curve storage means storing therein an output gradation reference curve;

computation data storage means storing therein computation data that is to be used for computing values to be plotted on an output gradation curve suitable for each of the image modes on the basis of the output gradation reference curve;

data processing means for processing the received data in accordance with the image mode selected by the selective input means on the basis of the output gradation reference curve stored in the output gradation reference curve storage means and the computation data stored in the computation data storage means, and generating the processed data; and image forming means for forming an image on the basis of the data generated by the data processing means;

wherein the computation data storage means is adapted to be addressed on the basis of the received data, and stores therein the computation data in the form of a plurality of computation tables from which addressed data is generated;

wherein the output gradation reference curve storage means is adapted to be addressed on the basis of data generated by any of the computation tables, and stores therein the output gradation reference curve in the form of a table from which addressed data is generated; and wherein the data processing means selects one of the computation tables which corresponds to the image mode selected by the selective input means, and applies the received image data as an address to the selected computation table.

14. An image forming apparatus as set forth in claim 13, wherein the data processing means, which employs plural computation tables in combination for at least one image mode, applies the received image data as an address to one of the plural computation tables, and applies data generated by the one computation table as an address to another computation table.

15. An image forming apparatus for processing received image data in accordance with a selected one of a plurality of image modes and forming an image on the basis of the received image data thus processed, the image forming apparatus comprising:

selective input means for selecting any one of the plurality of image modes;

output gradation reference curve storage means storing therein an output gradation reference curve;

computation data storage means storing therein computation data that is to be used for computing values to be plotted on an output gradation curve suitable for each of the image modes on the basis of the output gradation reference curve;

data processing means for processing the received data in accordance with the image mode selected by the selective input means on the basis of the output gradation reference curve stored in the output gradation reference curve storage means and the computation data stored in the computation data storage means and generating the processed data; and image forming means for forming an image on the basis of the data generated by the data processing means;

wherein the selective input means is capable of selecting any of the plurality of image modes that is offered by employing any one of image quality modes and any one of color modes in combination, the image quality modes including a character mode, a map mode, a photography mode, and a character/photography mode, the color modes including a full-color mode and a plurality of monochrome modes.

16. An image data processing process for processing received image data in accordance with a selected one of a plurality of image modes and providing data thus processed as an output, the image data processing process comprising the steps of:

computing output image data corresponding to the received image data which are to be plotted on an output gradation curve for the selected image mode, on the basis of an output gradation reference curve and predetermined computation data corresponding to the selected image mode; and providing the output image data thus computed;

wherein the step of computing the output image data includes the steps of:

preparing the computation data in the form of a plurality of computation tables that are adapted to be addressed on the basis of the received data and from which the addresses data is generated;

preparing the output gradation reference curve in the form of a table that is adapted to be addressed on the basis of output data from any of the computation tables and from which the addressed data is generated; and selecting one of the computation tables that corresponds to the selected image mode, and applying the received image data as an address to the selected computation table.

17. An image data processing process for processing received image data in accordance with a selected one of a plurality of image modes and providing data thus processed as an output, the image data processing process comprising the steps of:

computing output image data corresponding to the received image data which are to be plotted on an output gradation curve for the selected image mode, on the basis of an output gradation reference curve and predetermined computation data corresponding to the selected image mode; and providing the output image data thus computed;

wherein the step of computing the output image data includes the steps of:

preparing as the computation data a plurality of transformation method data for transforming the output gradation reference curve into an output gradation curve for each image mode, the transformation method data being designed such that data corresponding to input data within one range are compressed and data corresponding to input data within another range are expanded;

preparing the output gradation reference curve in the form of a reference table including a set of output data arranged in increasing order of the magnitude of input data;

determining a difference between each adjacent pair of output data in a sequence of at least three output data in the reference table and replacing a pair of output data giving a smallest difference with an average of the pair of output data for data compression; and determining a difference between each adjacent pair of output data in a sequence of at least three output data in the reference table and inserting between a pair of output data giving a greatest difference an average of the pair of the output data for data expansion.

* * * * *